(12) United States Patent
Salle et al.

(10) Patent No.: US 9,576,258 B1
(45) Date of Patent: Feb. 21, 2017

(54) COMPUTER EXECUTABLE SERVICE

(75) Inventors: Mathias Salle, San Francisco, CA (US); Erik L. Eidt, Campbell, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1870 days.

(21) Appl. No.: 12/261,317

(22) Filed: Oct. 30, 2008

(51) Int. Cl.
G06Q 10/06 (2012.01)
H04L 12/24 (2006.01)

(52) U.S. Cl.
CPC .... *G06Q 10/0631* (2013.01); *G06Q 10/06312* (2013.01); *G06Q 10/06375* (2013.01); *H04L 41/5009* (2013.01); *H04L 41/5019* (2013.01); *H04L 41/5054* (2013.01)

(58) Field of Classification Search
None
See application file for complete search history.

(56) References Cited

U.S. PATENT DOCUMENTS

| | | | | |
|---|---|---|---|---|
| 6,411,806 | B1 * | 6/2002 | Garner et al. | 455/428 |
| 6,580,916 | B1 * | 6/2003 | Weisshaar et al. | 455/456.1 |
| 6,822,940 | B1 * | 11/2004 | Zavalkovsky et al. | 370/237 |
| 7,703,102 | B1 * | 4/2010 | Eppstein et al. | 709/220 |
| 7,904,909 | B1 * | 3/2011 | Reiner et al. | 709/223 |
| 8,014,273 | B1 * | 9/2011 | Barrett et al. | 370/210 |
| 2002/0126675 | A1 * | 9/2002 | Yoshimura et al. | 370/395.21 |
| 2003/0097443 | A1 * | 5/2003 | Gillett et al. | 709/225 |
| 2004/0049509 | A1 * | 3/2004 | Keller et al. | 707/100 |
| 2005/0050175 | A1 * | 3/2005 | Fong et al. | 709/220 |
| 2005/0138625 | A1 * | 6/2005 | Carroll et al. | 718/104 |
| 2006/0064485 | A1 * | 3/2006 | Baron et al. | 709/224 |
| 2006/0161444 | A1 * | 7/2006 | Lubrecht et al. | 705/1 |
| 2006/0225032 | A1 * | 10/2006 | Klerk et al. | 717/105 |
| 2006/0277542 | A1 * | 12/2006 | Wipfel | 717/174 |
| 2007/0005320 | A1 * | 1/2007 | Vinberg et al. | 703/13 |
| 2007/0106642 | A1 * | 5/2007 | Kovrigin et al. | 707/3 |
| 2008/0059610 | A1 * | 3/2008 | Lin et al. | 709/220 |
| 2008/0126163 | A1 * | 5/2008 | Hogan et al. | 705/8 |
| 2008/0163171 | A1 * | 7/2008 | Chess et al. | 717/120 |
| 2008/0215713 | A1 * | 9/2008 | Cannon et al. | 709/221 |
| 2008/0243629 | A1 * | 10/2008 | Chang et al. | 705/26 |
| 2008/0244611 | A1 * | 10/2008 | Doyle et al. | 718/105 |
| 2008/0263084 | A1 * | 10/2008 | Faihe et al. | 707/103 R |
| 2008/0288502 | A1 * | 11/2008 | Coley et al. | 707/10 |
| 2009/0019137 | A1 * | 1/2009 | Mishra et al. | 709/220 |
| 2009/0019535 | A1 * | 1/2009 | Mishra et al. | 709/222 |
| 2009/0077090 | A1 * | 3/2009 | Pacifici et al. | 707/10 |
| 2009/0133026 | A1 * | 5/2009 | Aggarwal et al. | 718/103 |
| 2009/0192867 | A1 * | 7/2009 | Farooq et al. | 705/10 |

OTHER PUBLICATIONS

Lau, "Service Model and Its Application to Impact Analysis," 2004, Lecture Notes in Computer Science, vol. 3126, pp. 116-127.*

* cited by examiner

Primary Examiner — Ivan R Goldberg
(74) Attorney, Agent, or Firm — Wagner Blecher, LLP

(57) ABSTRACT

A method comprises receiving a set of variable parameters, determining at least one computer executable service based on the set of variable parameters, determining if there are more than one computer executable services based on the set of variable parameters, and if there are more than one computer executable services, resolving any conditional attributes between the more than one computer executable services. Each of the at least one computer executable service is characteristically dependent on at least one variable parameter of the set of variable parameters.

18 Claims, 14 Drawing Sheets

| | | |
|---|---|---|
| 302 | ACTIVATION SERVICE | THE ACTIVATION SERVICE IS A GENERIC ACTUATOR WHICH RESPONSIBILITY IS TO DISPATCH SERVICE ACTIVATION REQUESTS TO THE APPROPRIATE CUSTOM ACTIVATOR. |
| 304 | APPROVAL SERVICE | THE APPROVAL SERVICE (COMPUTATIONAL SERVICE) IS RESPONSIBLE FOR APPROVING OR NOT A RECEIVED ORDER. |
| 306 | AUTHENTICATION SERVICE | THE AUTHENTICATION SERVICE (DATA AND COMPUTATIONAL SERVICE) IS RESPONSIBLE FOR THE MANAGEMENT OF USERS, ROLES AND ACCESS RIGHT AS WELL AS FOR GRANTING AUTHORIZATIONS. |
| 308 | BILLING SERVICE | THE BILLING SERVICE (COMPUTATIONAL SERVICE) IS RESPONSIBLE FOR SETTING UP CHARGE BACK MECHANISM AND PROPER BILLING FOR RECEIVED ORDERS. |
| 312 | CATALOG SERVICE | THE CATALOG SERVICE (COMPUTATIONAL SERVICE) IS RESPONSIBLE FOR THE GENERATION OF A SERVICE OFFERINGS. |
| 314 | CONFIGURATION MANAGEMENT SERVICE | THE CONFIGURATION MANAGEMENT SERVICE (DATA SERVICE) IS RESPONSIBLE FOR CARRYING OUT THE BINDING PHASE OF THE INSTANTIATION PROCESS AND FOR THE MANAGEMENT OF THE LIFECYCLE OF INSTANCES. |
| 316 | CREATION CONFIGURATION SERVICE | THE CREATION CONFIGURATION SERVICE (DATA SERVICE) IS RESPONSIBLE FOR CARRYING OUT THE GROUNDING PHASE OF THE INSTANTIATION PROCESS. |
| 318 | DESIGN SERVICE | THE DESIGN SERVICE (DATA SERVICE) IS RESPONSIBLE FOR THE MANAGEMENT OF THE LIFECYCLE OF MODELS. |

FIG. 3A

| | | |
|---|---|---|
| 322 | DISCOVERY SERVICE | THE DISCOVERY SERVICE (COMPUTATIONAL SERVICE) IS A GENERIC ACTUATOR RESPONSIBLE FOR TRIGGERING THE DISCOVERY OF ASSETS IN THE INFRASTRUCTURE TO FULFILL ITS RESPONSIBILITY, IT CONNECTS TO CUSTOM DISCOVERY SERVICES. |
| 324 | INCIDENT SERVICE | THE INCIDENT SERVICE (DATA SERVICE) IS RESPONSIBLE FOR THE MANAGEMENT OF THE LIFECYCLE OF INCIDENTS. |
| 326 | INSTALLER SERVICE | THE INSTALLER SERVICE IS A GENERIC ACTUATOR WHICH RESPONSIBILITY IS TO DISPATCH SERVICE INSTALLATION REQUESTS TO THE APPROPRIATE CUSTOM ACTIVATOR. |
| 328 | LOGGING SERVICE | THE LOGGING SERVICE (DATA SERVICE) IS RESPONSIBLE FOR THE LIFECYCLE MANAGEMENT OF LOG MESSAGES |
| 332 | MONITORING SERVICE | THE MONITORING SERVICE IS A GENERIC ACTUATOR WHICH RESPONSIBILITY IS TO DISPATCH SERVICE MONITORING REQUESTS TO THE APPROPRIATE CUSTOM ACTIVATOR |
| 334 | OFFERING AVAILABILITY ESTIMATION SERVICE | THE OFFERING AVAILABILITY ESTIMATION SERVICE (COMPUTATIONAL SERVICE) IS RESPONSIBLE FOR THE GENERATION OF SERVICE OFFERING AVAILABILITY AND PRICING |
| 336 | ORDER PROCESSING SERVICE | THE ORDER PROCESSING SERVICE (DATA SERVICE) IS RESPONSIBLE FOR THE MANAGEMENT OF THE LIFECYCLE OF ORDERS |

FIG. 3B

| | | |
|---|---|---|
| 338 | PACKAGE MODEL DESIGN SERVICE | THE PACKAGE MODEL DESIGN SERVICE (DATA SERVICE) IS RESPONSIBLE FOR THE LIFECYCLE MANAGEMENT OF PACKAGE MODEL. |
| 342 | POLICY SERVICE | THE POLICY SERVICE (DATA AND COMPUTATIONAL SERVICE) IS A GENERIC SERVICE AND HAS RESPONSIBILITY OF DISPATCHING POLICY EVALUATION REQUESTS TO THE APPROPRIATE SPECIFIC POLICY SERVICES. |
| 344 | REQUEST RESOLUTION SERVICE | THE REQUEST RESOLUTION SERVICE (COMPUTATIONAL SERVICE) IS RESPONSIBLE FOR THE INITIATING THE INSTANTIATION PROCESS OF MODELS. |
| 346 | RFC EXECUTION SERVICE | THE REQUEST FOR CHANGE (RFC) EXECUTION SERVICE (DATA SERVICE) IS RESPONSIBLE FOR THE MANAGEMENT OF THE LIFECYCLE OF RFC'S IN THE PLATFORM. |
| 348 | RFC SCHEDULING SERVICE | THE REQUEST FOR CHANGE (RFC) SCHEDULING SERVICE (COMPUTATIONAL SERVICE) IS RESPONSIBLE FOR FINDING OPTIMAL SCHEDULES FOR RFC IN THE PLATFORM. |
| 352 | SESSION SERVICE | THE SESSION SERVICE (DATA SERVICE) IS RESPONSIBLE FOR THE MANAGEMENT OF THE LIFECYCLE OF SESSIONS. THE CREATE METHOD GENERATE A NEW SESSION IN THE OPEN STATE ASSOCIATED WITH A NEW, UNIQUE SESSIONKEY, CHANGES TO THE SESSION STATE, SUCH AS CLOSING THE SESSION, IS DONE THROUGH THE UPDATE METHOD. |
| 354 | VALIDATION SERVICE | THE VALIDATION SERVICE (COMPUTATIONAL SERVICE) IS RESPONSIBLE FOR THE VALIDATION OF THE WELL FORMNESS OF AN ORDER. |
| 356 | CHANGE CATALOG SERVICE | THE CHANGE CATALOG SERVICE IS RESPONSIBLE FOR THE MANAGEMENT OF CHANGES TO THE CATALOG. |
| 358 | CONSUMER MANAGEMENT SERVICE | THE CONSUMER MANAGEMENT SERVICE IS RESPONSIBLE FOR PROVIDING AN INTERFACE FOR CONSUMERS AND MANAGES RETRIEVING SERVICE OFFERINGS, ORDERING SERVICES, RETRIEVING CHANGES, ORDER CHANGES, AND LOGINS. |
| 360 | PROVIDER MANAGEMENT SERVICE | THE PROVIDER MANAGEMENT SERVICE IS RESPONSIBLE FOR PROVIDING AN INTERFACE FOR PROVIDERS AND MANAGES USERS, DESIGNS, AND PRICING. |

FIG. 3C

COMPUTER EXECUTABLE SERVICE

FIELD

Embodiments of the present invention relate in general to the field of information technology.

BACKGROUND

Over the last few years, information technology (IT) organizations have increasingly adopted standards and best practices to ensure efficient IT service delivery. In this context, the IT Infrastructure Library (ITIL) has been rapidly adopted as the de facto standard. ITIL defines a set of standard processes for the management of IT service delivery organized in processes for Service Delivery (Service Level Management, Capacity Management, Availability Management, IT Continuity Management and Financial Management) and Service Support (Release Management, Configuration Management, Incident Management, Problem Management and Change Management). The service support processes, such as Configuration Management, Incident Management, and Configuration Management are some of the more common processes IT organizations have implemented to bring their service to an acceptable level for their businesses.

The implementation of ITIL processes has yielded significant results to IT organizations by defining interfaces between service providers and consumers; by clarifying the IT organizational structures, roles, and responsibilities; and by designing internal processes for the management of IT operations. IT Service Management (ITSM) is a process-based practice intended to align the delivery of IT services with the needs of the enterprise, while emphasizing benefits to customers. ITSM focuses on delivering and supporting IT services that are appropriate to the business requirements of the organization, and it achieves this by leveraging ITIL-based best practices that promote business effectiveness and efficiency. Thus, the focus of ITSM is on defining and implementing business processes and interactions there between to achieve desired results. IT services are typically built around the processes. For example, in a manufacturing application, the ITSM may provide services built around a build-to-order manufacturing process scenario. The ITSM architecture generally provides services that are capable of being directly instantiated. With a focus on processes, presenting and packaging an organization's IT needs may be a challenge in an ITSM environment. Additionally, as a plethora of new services are developed and continuously refined, the determination of services and hardware from numerous combinations may be a challenge.

SUMMARY

Various embodiments of methods, systems, and computer program products for computer executable services are discussed herein. In one embodiment, a method comprises receiving a set of variable parameters, determining at least one computer executable service based on the set of variable parameters based on the set of variable parameters, determining if there are more than one computer executable services, and if there are more than one computer executable services, resolving any conditional attributes between the more than one computer executable services. Each of the at least one computer executable service is characteristically dependent on at least one variable parameter of the set of variable parameters.

BRIEF DESCRIPTION OF THE DRAWINGS

FIGS. 3A, 3B, and 3C illustrate in a tabular form an example list of service operations supported by an architecture described with reference to FIGS. 2A and 2B, according to an embodiment.

DESCRIPTION OF EMBODIMENTS

Figure 1A:
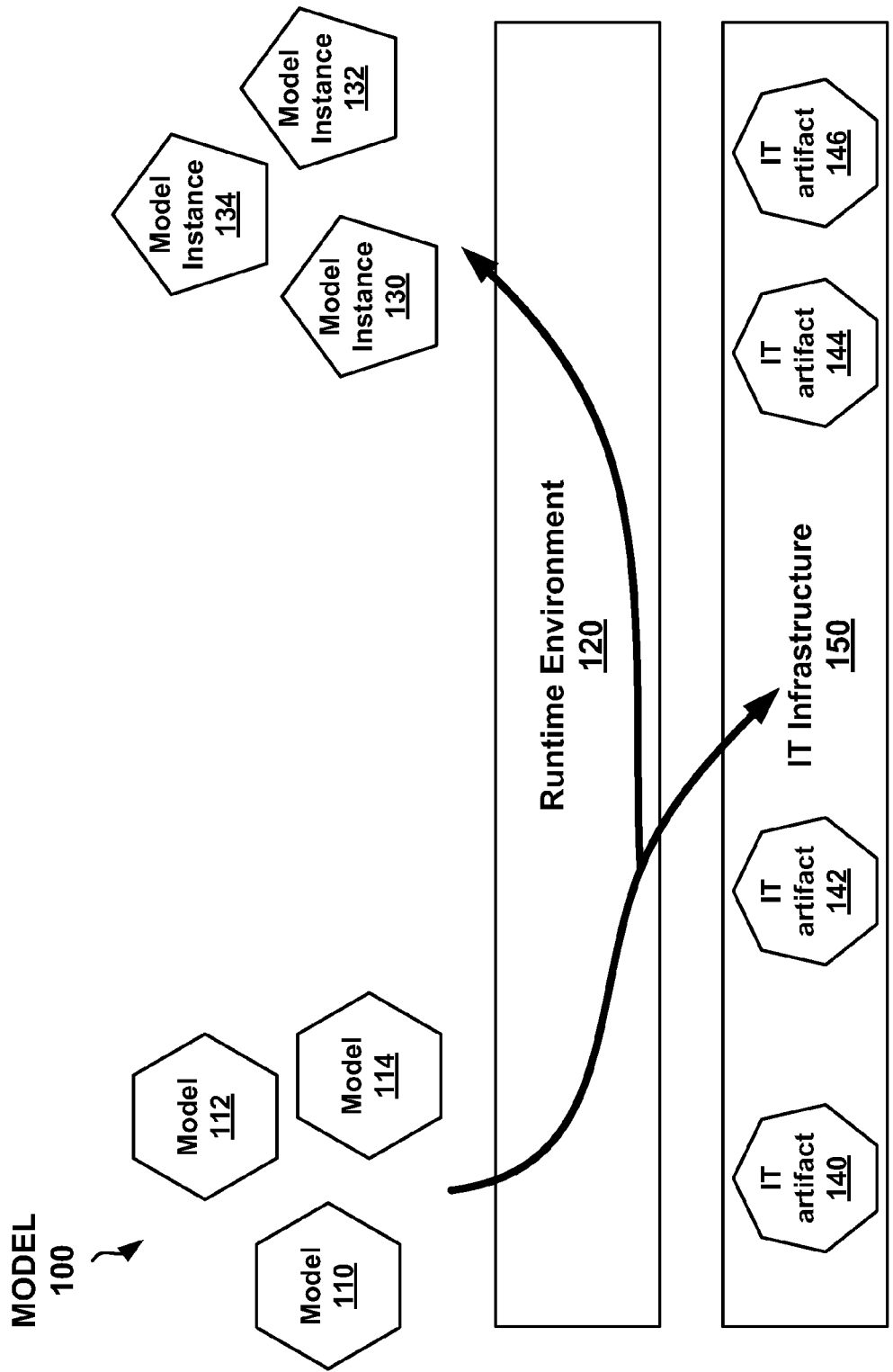
FIG. 1A illustrates an example structure of a model for IT services, according to an embodiment.

Reference will now be made in detail to various embodiments of the present invention, examples of which are illustrated in the accompanying drawings. While the embodiments of the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

The following terminology may be useful in understanding embodiments of the present disclosure. It is to be understood that the terminology described herein is for the purpose of description and should not be regarded as limiting.

Architecture—A blueprint or basic infrastructure designed to provide one or more functions. An architecture used in an IT environment may typically include hardware, software and services building blocks that are designed to work with each other to deliver core functions and extensible functions. The core functions are typically a portion of the architecture, e.g., an operating system, which may not be modifiable by the user. The extensible functions are typically a portion of the architecture that has been explicitly designed to be customized and extended by the user as a part of the implementation process. For example, services oriented architecture (SOA) is a type of an architecture used for addressing the need for structuring IT services that lowers cost and enhances reusability.

Model—A model can be a representation of the characteristics and behavior of a system, element, solution, or service. A model as described herein captures the design of a particular IT system, element, solution, or service. The model can be a declarative specification of the structural, functional, non-functional, and runtime characteristics of the IT system, element, solution, or service. The instantiation of a model creates a model instance. Unlike object oriented (OO) theory, in which an instance object can be a slot space, the model instance can be a design space that may be capable of accommodating refinement.

IT artifact—An IT artifact refers to a tangible attribute or property of an IT system. Examples of an IT artifact may include hardware, software, documentation, source code, test apparatus, project plans, educational and marketing material, and similar others. The IT artifact may be available for external or internal use.

Separation of concerns—A technique for addressing different issues of a problem individually, thereby making it possible to concentrate on each issue separately. Applying this principle may result in a decrease in the complexity by dividing the problem into different smaller issues; support division of efforts and separation of responsibilities; and improve the modularity of IT systems or artifacts.

Service—Utility or benefit provided by a provider to a consumer. The provider and the consumer may vary by application and may include an enterprise, a business unit, a business process, an application, a third party, an individual, and similar others. Enterprise services may be provided in the course of conducting the enterprise business. IT services generally refer to any application that enables the enterprise to provide utility or benefit by adding functionality to the IT infrastructure.

Service Model—A service model can be the representation of a service within a SOA. It defines the externally visible description, behavior, state, and operations available from a service to other services. As described herein, instantiation of a service model can be conducted in two phases—a binding phase and a grounding phase. The binding phase can be responsible for resolving dependencies between models. The grounding phase can be responsible for materializing the instances, e.g., by creating an IT artifact corresponding to the specification defined in the service model instance.

Meta Model—A meta model (or metamodel) can be a description of a set of building blocks, constructs and rules that define the model itself.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Applicants recognize that it would be desirable to provide a services architecture that would include tools and techniques to initially design, reuse, maintain, and refine services during their entire lifecycle, thereby ensuring alignment between IT services and IT infrastructure. That is, it would be desired to provide IT service lifecycle management tools and techniques that would promote the development, capture, and subsequent reuse and refinement of reliable and scalable services. Applicants further recognize that it would be desirable that the separation of concerns between the artifacts managed by the services be based on roles, e.g., a designer or developer and an end user of services. Therefore, a need exists to provide improved tools and techniques to be used in the automation of IT services lifecycle management.

Embodiments of systems and methods disclosed herein provide an architecture that is capable of designing and delivering IT services that are entered as a configure-to-order compared to a build-to-order provided by traditional ITSM services. An analogy may be made between a builder that is capable of building standard model homes that are orderable as a build-to-order home and an architect designed home that is capable of building a customized home in accordance with user specifications and that is orderable as a configure-to-order home. New features or functions of the configure-to-order home that were not included in the standard build-to-order home may be cataloged (with known price and delivery) and offered as re-usable features or functions that may be combined with existing model homes.

A Model for Information Technology (IT) Services

FIG. 1A illustrates an example structure of a model 100, according to an embodiment. The model 100 captures the design of a particular IT element or solution, e.g., IT services captured as a service model. As described earlier, a service model can be the representation of a service within a SOA. It defines the externally visible description, behavior, state, and operations available from a service to other services. The model 100 includes one or more models 110, 112 and 114 capable of being instantiated in a runtime environment 120 to generate corresponding model instances 130, 132 and 134 and corresponding IT artifacts 140, 142, 144 and 146 generated in an IT infrastructure 150. Thus, the instantiation of a model results in a generation of a virtual runtime object, e.g., the model instance, and also results in a generation of a real, tangible IT artifact in the IT infrastructure 150. The IT infrastructure 150 may be a data center that includes hardware, software, communications, applications, services and similar other components to provide IT functions. The runtime environment 120 includes services that process the models 110, 112 and 114.

The model 100 can be a declarative specification of the structural, functional, non-functional, and runtime characteristics of an IT system. That is, the model 100 may use declarative programs that may include expressions, relationships, or statements of truth. The declarative programs may not include variables. Closely equivalent to the concept of a class in Object Oriented (OO) theory, the model 100 supports the principles of encapsulation and hiding of implementation detail. As in OO, the model 100 also supports recursive composition. Also as in OO theory, in which a class instantiation results in an object, the instantiation of a model results in the creation of a model instance. However, unlike OO, in which an instance object is a slot space, the model instance, e.g., each of model instances 130, 132 and 134, can be a design space that can accommodate refinement. In addition, as described earlier, a corresponding IT artifact becomes associated with the model. In the depicted embodiment, the bi-instantiation process for the models 110, 112 and 114 is desirable to not only create a virtual runtime object that represents that particular instance of the model but in addition also generate an IT component or system in the real, tangible, IT Infrastructure 150. A relationship between a model instance, e.g., one of the model instances 130, 132 and 134, and an IT artifact, one of the IT artifacts 140, 142, 144 and 146, is therefore homomorphic. That is, one represents the other and a change in one is reflected in the other. Additional description of the two-phase instantiation process for a model is described with reference to FIG. 1B.

Referring back to FIG. 1A, in order to support initial design, reuse, maintain, and refinement during the entire lifecycle of the models, the model 100 supports the following example properties (among others): refinement, variability, polymorphism, composability, import, association, constructors, operations, deployment, monitors, declarative modeling language, and best practice. Recursive composability enables a designer to depend on and leverage existing designs in order to define or create new ones, which in turn are available to others to reuse. Refinement allows the instantiation process to be multi-step, thereby allowing for a greater flexibility in the model design. Encapsulation (also referred to as information hiding), use of clear boundary between the visibility into the internal design of a model and its publicly available characteristics, supports inter-model dependencies that allow changes to the internal specification without requiring changes in the model user. Characterization enables the expressing the outward nature of the model in terms that are directly relevant to the consumer of the model instead of in terms relevant to the implementer. Variation enables capturing variations in a single model. A model may be defined under several variations of its characteristics to reflect specific changes to the underlining design. Capturing these variations in a single model avoids combinatorial explosion of models and supports better model reuse. Declaration enables definition of models using declarative specifications. The models are defined in terms of their association to underlying design instead of as process steps for instantiation using programming code. Use of statements of truth to define the models reduce errors due to interpretation or avoid use of languages have meaning only during execution in the intended environment.

The models 110, 112 and 114 can be defined by a meta model, thereby enabling the models 110, 112 and 114 to be translated into other modeling languages. Thus, model 100 enables easy translation of user-defined models to other forms (both model-oriented and script-oriented forms) thereby enhancing its flexibility. In addition, model 100 provides the tools and techniques for the replacement of one modeling language with other modeling languages and for the coexistence of multiple structural modeling languages. As described herein, a meta model is a model that further explains or describes a set of related models. Specifically, the meta model includes an explicit description (of constructs and rules) of how a domain-specific model is built.

The model 100 may be specified by using various modeling languages including, among others, a unified modeling language (UML), the Resource Description Framework (RDF), Extensible Markup Language (XML) Schema, XML Metadata Interchange (XMI), and Java languages or a combination thereof. The RDF may include extensions such as RDF schema and languages such as the RDF Ontology Web Language (RDF/OWL).

The concept of refinement, which may be an example of an extensible feature of the model 100, allows a smooth multi-valued transition from a model to a model instance. Whereas classic modeling approaches [OO, CIM, SML, UML] are based on a single value slot mechanism for instance creation, refinement can be based on a linked list approach that enables multi-slot capabilities for model elements. In addition, substitution can be supported, similar to XML schema. A refinable object or a refinable model element is any object/element that extends a refinable construct. The refinable construct carries metadata including: 1) allowRefinement: a Boolean attribute that can be used to stop the refinement process, 2) timestamp: a timestamp that record the time at which the refinement occurred, and 3) tag: a tag that records extra information such as purpose of the refinement or similar other.

Figure 1B:
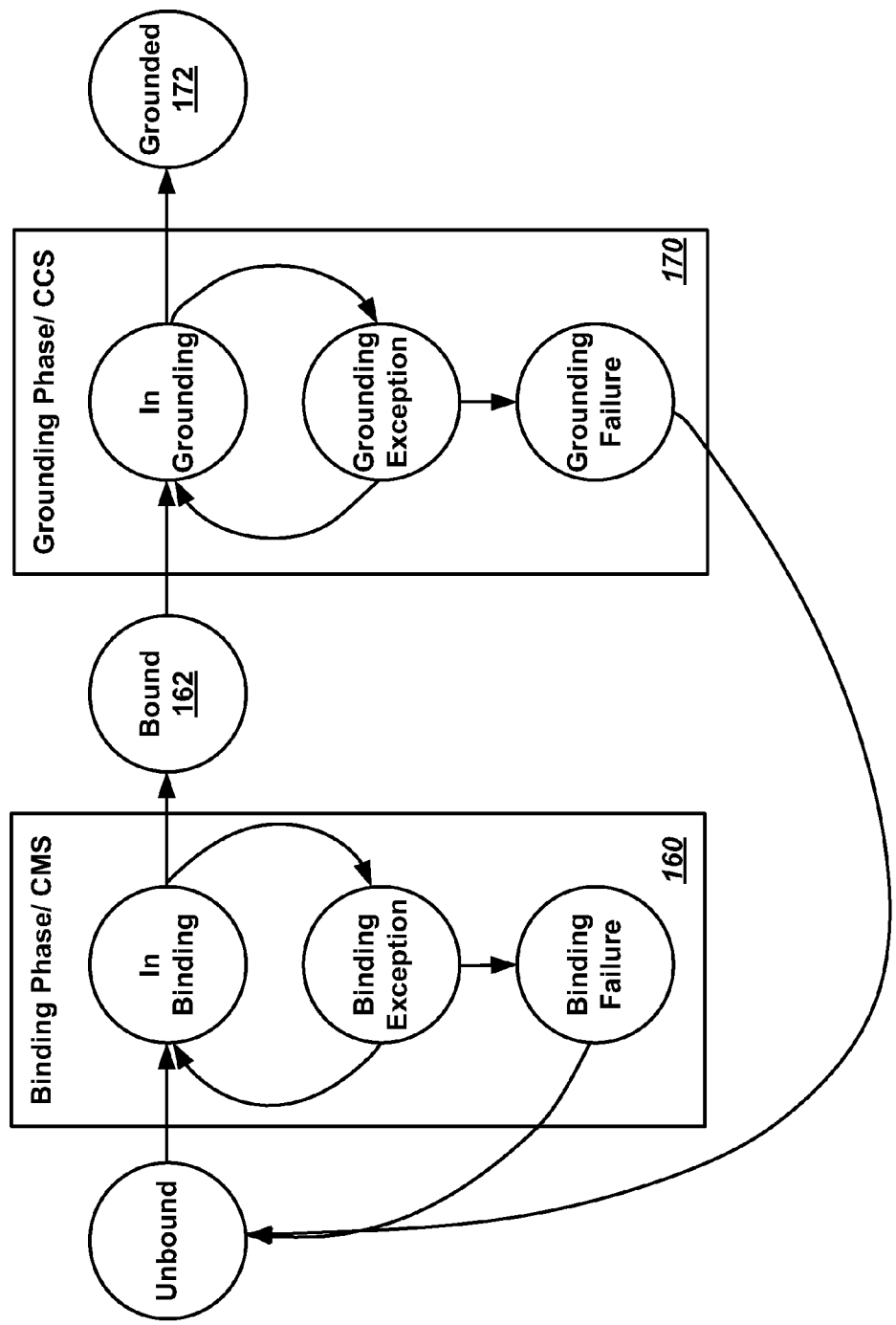
FIG. 1B describes a state transition diagram for a two-phase model instantiation process, according to an embodiment.

FIG. 1B illustrates a state transition diagram for a two-phase model instantiation process, according to an embodiment. The instantiation of a model, e.g., any one of the models 110, 112 and 114, can be conducted in two phases: a binding phase 160 and a grounding phase 170. In an example, non-depicted embodiment, the binding phase 160 may be implemented in a binding phase engine and a grounding phase 170 may be implemented in a grounding phase engine. In the binding phase 160 inter-model dependencies, e.g., made by a model to other models, can be resolved. An output of the binding phase 160 is a bound model instance 162. Model instances 130, 132, and 134 are examples of the bound model instance 162. The binding phase 160 may be viewed to provide a dynamic linking between model instances. Dependencies to other models can be abstract, refined or very specific and the binding phase 160 resolves these types of model references by reusing existing instances or creating new instances. The binding phase can be inherently recursive in that the binding of a dependent model can itself trigger a binding of its dependencies.

In the grounding phase 170, the bound model instance 162 can be materialized to generate a bound and grounded model instance 172. The materializing includes creating an IT artifact corresponding to the specification defined in the model instances. This can be achieved by recursively traversing the instance tree and creating, when appropriate, the corresponding artifacts in the IT infrastructure. IT artifacts 140, 142, 144 and 146 are examples of a bound and grounded model instance 172.

An Architecture for a Runtime Environment

Figure 2A:
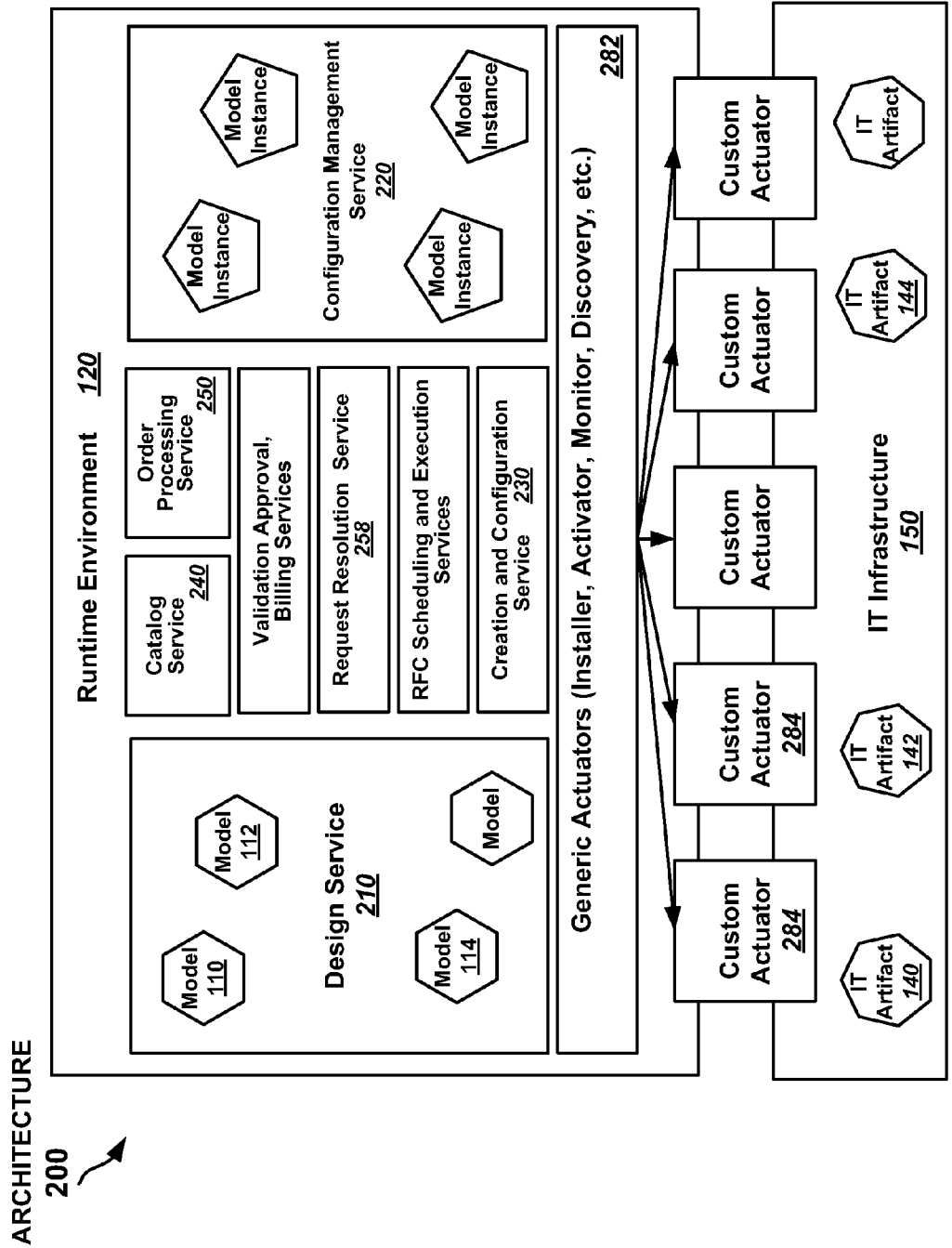
FIG. 2A illustrates an architecture for a runtime environment described with reference to FIG. 1A, according to an embodiment.
Figure 2B:
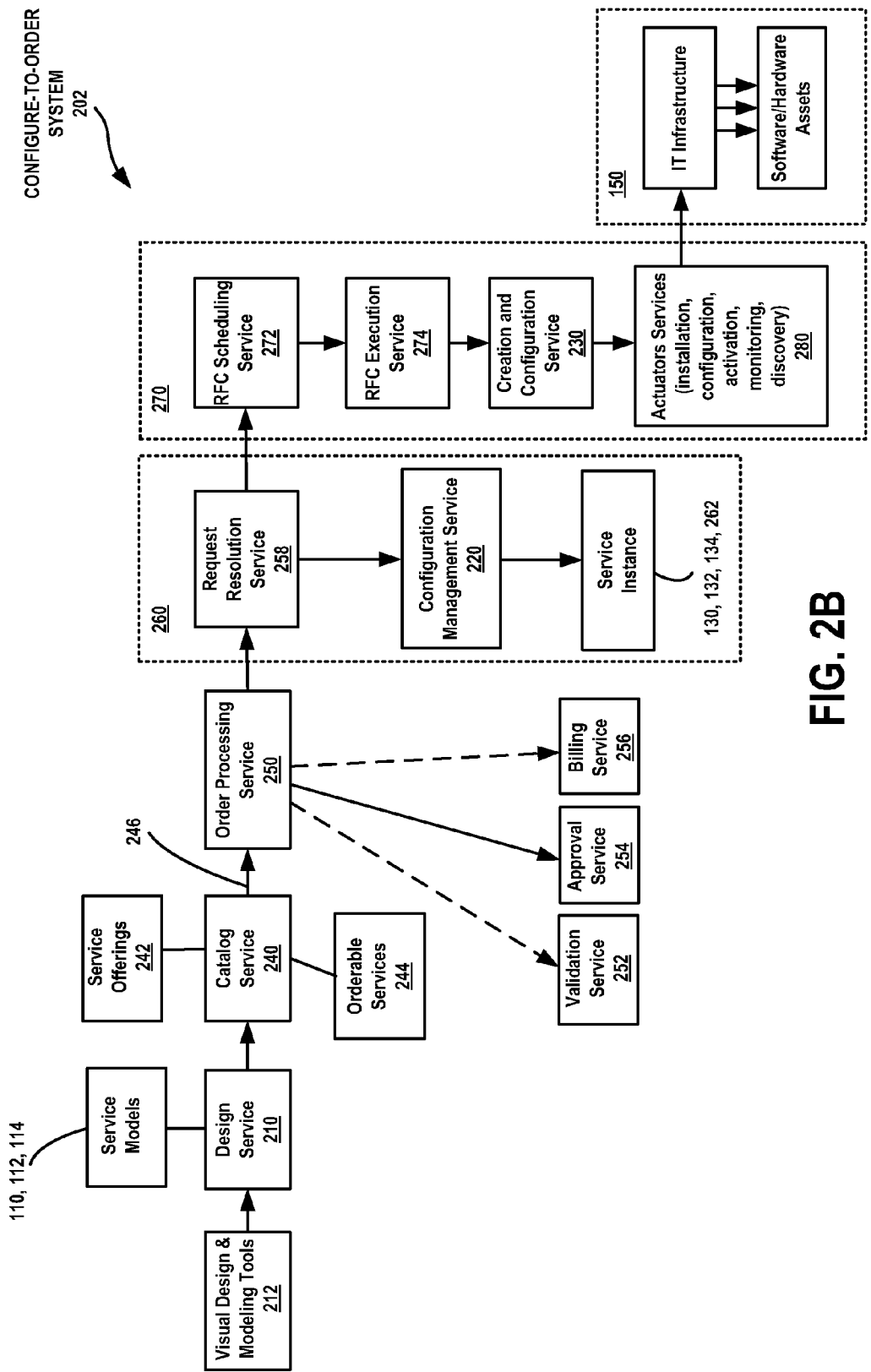
FIG. 2B illustrates a block diagram of a configure-to-order system to implement an architecture described with reference to FIG. 2A, according to an embodiment.

FIG. 2A illustrates an architecture 200 for a runtime environment 120 described with reference to FIG. 1A, according to an embodiment. The architecture 200 can be deployed to provide e-commerce for IT services. That is, the architecture 200 may be deployed as a configure-to-order business system in which a set of predefined models of IT systems are offered to customers (may include internal or external users, clients and similar others). FIG. 2B illustrates a block diagram of a configure-to-order system 202 to implement an architecture 200 described with reference to FIG. 2A, according to an embodiment.

Referring to FIGS. 2A and 2B, the predefined models are for IT services. It is understood that the models may be expressed for other aspects of IT within an enterprise. The architecture 200 includes a design service 210 operable to generate models 110, 112 and 114. The design service 210 may include design tools 212 and techniques (such as declarative programming) available to a designer or an architect of IT services to manage the lifecycle of the models from initial design to cataloging to refinement. In a particular embodiment, the design service 210 can be operable to capture declarative specifications of services as a service model.

A catalog service 240 can be operable to store a plurality of service offerings 242. The plurality of service offerings 242 are models of services that are cataloged and are orderable by a customer. The catalog service 240 communicates with the design service 210 to access one or more service models that are new and not been previously cataloged. The service models may include modifications or refinements made to existing models included in the plurality of service offerings 242. The one or more service models generated by the design service 210 are combined into the plurality of service offerings 242 to provide a catalog of orderable services 244.

End users may access the features of the configure-to-order system 202 through the catalog service 240 and an Order Processing Service (OPS) 250 to browse, search, select, configure, and order the type of service model to be created and ordered or the type of changes desired to an existing model. In order to simplify the user interface, the catalog service 240 may filter model information provided to the user. That is, complex details about the model and its methods and properties, which may be provided to a designer or an architect, may be hidden from the user, thereby simplifying the user interface. For example, complex details of a blade server model having several processors arranged as a cluster may be presented to the user as a normal, high, and non-stop availability selection. Included in the information provided to the user is price and delivery associated with the order. In a particular embodiment, at least one orderable service 246 can be selectable from the catalog of orderable services 244 for placing an order. The selection may be performed by one of a user and an application program. In a particular embodiment, the OPS 250 can include a set of intermediate services for performing validation 252, approval 254 and billing 256 of the end user order.

An order instantiation service 260 is coupled to receive the order (that has been validated and approved) for the at least one orderable service 246 from the OPS 250. Specifically, upon validation and approval of the order by the OPS 250, a request resolution service 258 can be triggered to initiate further processing of the order by the order instantiation service 260. The order instantiation service 260 can be operable to instantiate the at least one orderable service 246, thereby generating an instantiated ordered service 262. The order instantiation service 260 includes a configuration management service (CMS) 220 operable to perform the binding phase 160 and generate the instantiated ordered service 262. The CMS 220 includes tools and techniques for implementing the binding phase 160 of the two-phase instantiation process as well the management of the model instances, e.g., model instances 130, 132 and 134. The CMS 220 generates a service instance corresponding to each order.

An order fulfillment service 270 can be operable to fulfill the order in accordance with the instantiated ordered service 262. The order fulfillment service 270 can include a request for change (RFC) scheduling 272 and a RFC execution service 274 for the sequencing of the various orders in the runtime environment 120. The order fulfillment service 270 includes a creation and configuration service (CCS) 230 operable to perform the grounding phase 170 of instantiated ordered service 262. The CCS 230 includes tools and techniques for the implementation of the grounding phase 170, which includes creation of IT artifacts (such as artifacts 140, 142, 144 and 146) in the IT infrastructure 150.

The connection between the runtime environment 120 and the IT infrastructure 150 can be performed through an actuator service 280. The actuator service 280 may include two layers, a generic actuator 282 and a custom actuator 284. In an embodiment, more than one generic actuators and more than one custom actuators may be included. The generic actuator 282 can be operable to dispatch instances to the custom actuator 284. For example, a server model may be configured to define deployment and provisioning information related to a Rapid Deployment Pack (RDP) deployer.

A deployment request can be triggered from the CCS 230 to a generic installer included in the generic actuator 282, which in turn will search for a specialized deployer that can handle RDP deployment information. This technique enables a loose coupling between the runtime environment 120 and the IT infrastructure 150 and offers a high level of customization. That is, the architecture 200 provides IT service lifecycle management tools and techniques that promote the development, capture, and subsequent reuse and refinement of reliable and scalable services. In addition, the architecture 200 further provides the separation of concerns between the artifacts managed by the services be based on roles, e.g., a designer or developer (e.g., user of the design service 210) and an end user of services (e.g., user of the catalog service 240).

In a particular embodiment, the architecture 200 is scalable to be deployed in applications having varying scope and complexity starting from a blade server to a large scale, enterprise-wide IT service. In an example non-depicted embodiment, SmartRack can be an example name of an application of the architecture 200 that combines hardware, management software, and applications to provide customers with a unique, systematic experience to IT conceptualization, delivery, and consumption. This can be accomplished by both shipping the management software embedded with the hardware and by providing a systematic way of modeling applications that can be deployed. Once a SmartRack is powered on, the main point of user contact can be the catalog service. Service offerings can be presented to the user along with their available configuration options, each of which are characterized in terms of the resulting service's attributes, the cost, and time to build. Service offerings may be dynamically generated views based on a set of rich models, stored in the design service, that weave together the structural, functional, non functional, and runtime characteristics of a service using a set of best practices. In a typical deployment, SmartRacks may be configured with pre-populated foundation models. Other models may be either purchased and downloaded from Hewlett Packard Development Company, L.P. (HP) or 3rd parties, or developed in house by customers. Once the appropriate service offering is selected and ordered, it can be sent to the management services that will process it and ground (materialize) it using a set of installer services. If specified in the model, once grounded, the various elements of the model are automatically monitored by monitoring service(s). SmartRacks may be deployed in stand alone mode when a customer only desired one rack of blades. In addition, through its built-in federation capability, several SmartRacks can be combined together providing a unified management experience for the customer. Lastly, SmartRack, through its open SOA architecture and service proxy technology, can support the substitution of its services by external services allowing SmartRacks to reuse existing management software assets of the enterprise, and, allow more than one SmartRacks to be combined so that they are both managed through one user interface (instead of each being independent).

In an example, non-depicted embodiment, the architecture 200 can be a scaled up to a full enterprise architecture that puts services as the key economic principle of value transfer between business (or enterprise) and IT. IT may provide "IT-consumed services" to operate itself (tools and techniques to improve internal productivity). These are things like service desk technologies, change management systems, blades, facility services, networks, employees, legal services. These services can be thought of as the tooling of IT, and together they can be used to create the IT deliverable, the "IT-delivered service." IT-delivered services can be created by IT for use by the business. Examples might include a consumer credit check service, employee expense reporting service, new employee set up service, a QA lab rental service, a private network and similar others. The IT delivered services can be delivered as an economic unit of value to the business. In other words, they are designed, constructed and delivered in a way such that the lines of business see its value, and are willing and able to purchase them. In fact, the IT-delivered service transforms into to a business-consumed service at the moment of payment. This payment can be indicative of the value as perceived the consumer, which in this case is the line of business. The IT-delivered services in and of themselves render IT as a service provider.

IT services provided to a business may be defined starting with a name (e.g. sales forecasting service), followed by a description (e.g. daily worldwide sales pipeline report and analysis for senior sales management). Every service may need additional artifacts and descriptors that are associated with the ongoing integrity of the service. These may include the service level agreements (SLAs) so that IT and the business are aligned around performance and availability, a logical and physical view of the configuration items that underpin the service, a view of dependant services, documentation, a continuity plan, knowledge entries, subscriber entitlements, and security and access provisions. The IT services may be defined by defining a service-line category structure. Just like consumer goods providers have product line categories, so do IT services. They may include employee services, application services, network services, others. Similar to consumer products, IT services may be established with a price, value and business outcome for each service. In order to qualify as an IT-delivered service, it is desirable that there is an associated, measurable business outcome. The IT services can be made available through a customer catalog service by developing a consistent way to articulate both a public characterization (business-facing) and private implementation (IT-facing). Service components can be reused whenever possible. Consistent design criteria for both the public and private facing aspects of the service can directly impact the process automation effort required to instantiate, monitor and manage the service throughout its lifecycle. Service visibility and integrity can be maintained at all levels including management stakeholders like the service desk, problem managers, change managers, application owners, IT finance managers, business relationship managers are able to view and manage activities around the service definition in a consistent way. When scaling up to the enterprise-wide architecture, IT provided services are defined as models and the services of the runtime environment are the embodiments of the IT consumed services.

Example Services Supported by the Architecture 200

FIGS. 3A, 3B, and 3C illustrate in a tabular form an example list of service operations supported by the architecture 200 described with reference to FIGS. 2A and 2B, according to an embodiment. In accordance with the principles of Service Oriented Architecture (SOA), components in the architecture 200 are conceived as services, that is, independent units of functionality with well specified interfaces and data models. The list of services may be described to perform a generic service (for aggregating data across data services), a data service (for the management of lifecycle of specific data models), a computational service (for the execution of business logic) or a combination thereof. An activation service 302 can be a generic actuator with responsibility to dispatch service activation requests to an appropriate custom activator. An approval service 304 (computational service) can be responsible for approving or not approving a received order. An authentication service 306 (data and computational service) can be responsible for the management of users, roles and access rights as well as granting authorizations. A billing service 308 (computational service) can be responsible for setting up charge back mechanism and proper billing for received orders.

A catalog service 312 (computational service) can be responsible for the generation of a service offerings. A configuration management service 314 (data service) can be responsible carrying out a binding phase of the instantiation process and for the management of the lifecycle of instances. A creation configuration service 316 (data service) can be responsible for carrying out a grounding phase of the instantiation process. A design service 318 (data service) can be responsible for the management of the lifecycle of models.

A discovery service 322 (computational service) can be a generic actuator responsible for triggering the discovery of assets in the infrastructure. To fulfill its responsibility, discovery service 322 can connect to custom discovery services. An incident service 324 (data service) can be responsible for the management of the lifecycle of incidents or events. An installer service 326 can be a generic actuator responsible to dispatch service installation requests to the appropriate custom activator. A logging service 328 (data service) can be responsible for the lifecycle management of log messages.

A monitoring service 332 can be a generic actuator which has the responsibility to dispatch service monitoring requests to the appropriate custom activator. An offering availability estimation service 334 (computational service) can be responsible for the generation of service offering availability and pricing. An order processing service 336 (data service) can be responsible for the management of the lifecycle of orders. A package model design service 338 (data service) can be responsible for the lifecycle management of a package model.

A policy service 342 (data and computational service) can be a generic service and has the responsibility of dispatching policy evaluation requests to the appropriate specific policy services. A request resolution service 344 (computational service) can be responsible for initiation of the instantiation process of models. A request for change (RFC) execution service 346 (data service) can be responsible for the management of the lifecycle of RFCs in the platform. A RFC scheduling service 348 (computational service) can be responsible for finding optimal schedules for RFC in the platform.

A session service 352 (data service) can be responsible for the management of the lifecycle of sessions. The create method generates a new session in the open state associated with a new, unique SessionKey. Changes to the session state, such as closing the session can be done through the update method. A validation service 354 (computational service) can be responsible for the validation of an order.

A change catalog service 356 can be responsible for the management of changes to the catalog, such as changes due to new features, software updates, hardware availability, etc. The consumer management service 358 can be responsible for providing an interface for consumers and manages retrieving service offerings, ordering services, retrieving changes, making order changes, establishing logins, and the like. The provider management service 360 can be responsible for providing an interface for providers, thus allowing management of users and profiles, designs, designs supported, pricing, and the like. In various embodiments, the consumer management service 358 and/or the provider management service 360 coordinates with the session service 352 to provide an interface for users.

Figure 4:
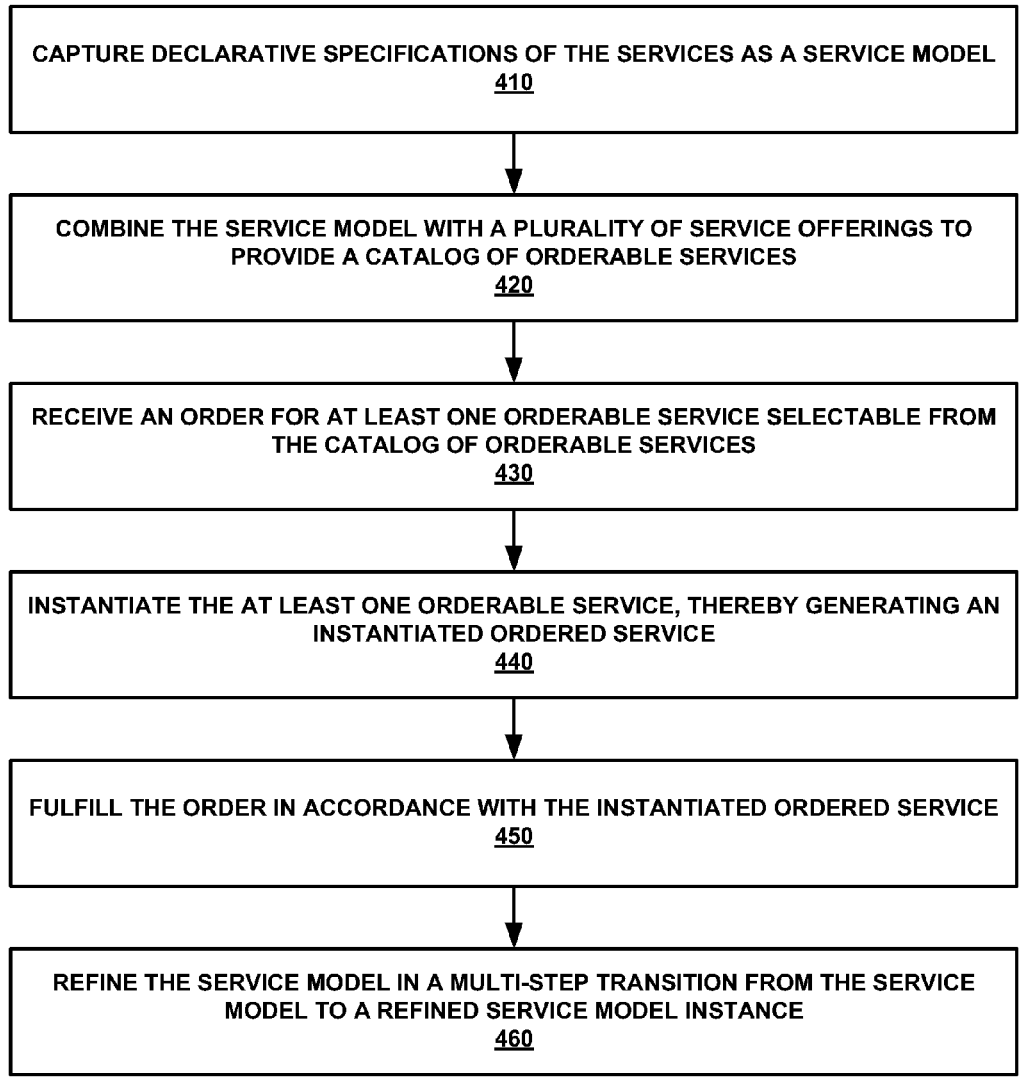
FIG. 4 is a flow chart of a method for managing IT services, according to an embodiment.

FIG. 4 is a flow chart of a method for managing IT services, according to an embodiment. In a particular embodiment, the method may be used to manage the model 100 described with reference to FIGS. 1A and 1B. In an embodiment, the method may be used to manage IT services provided by the architecture 200 deployable in an e-commerce environment. At step 410, declarative specifications of the services are captured as a service models. At step 420 the service models can be combined into a plurality of service offerings to provide a catalog of orderable services. At step 430, an order can be received for at least one orderable service selectable from the catalog of orderable services. At step 440, the at least one orderable service can be instantiated, thereby generating an instantiated ordered service. At step 450, the order can be fulfilled in accordance with the instantiated ordered service.

It is understood, that various steps described above may be added, omitted, combined, altered, or performed in different orders. For example, a step may be added to refine the service models. At step 460, the service models can be refined, the refining including a multi-step transition from the service models to a refined service model instance.

Figure 5:
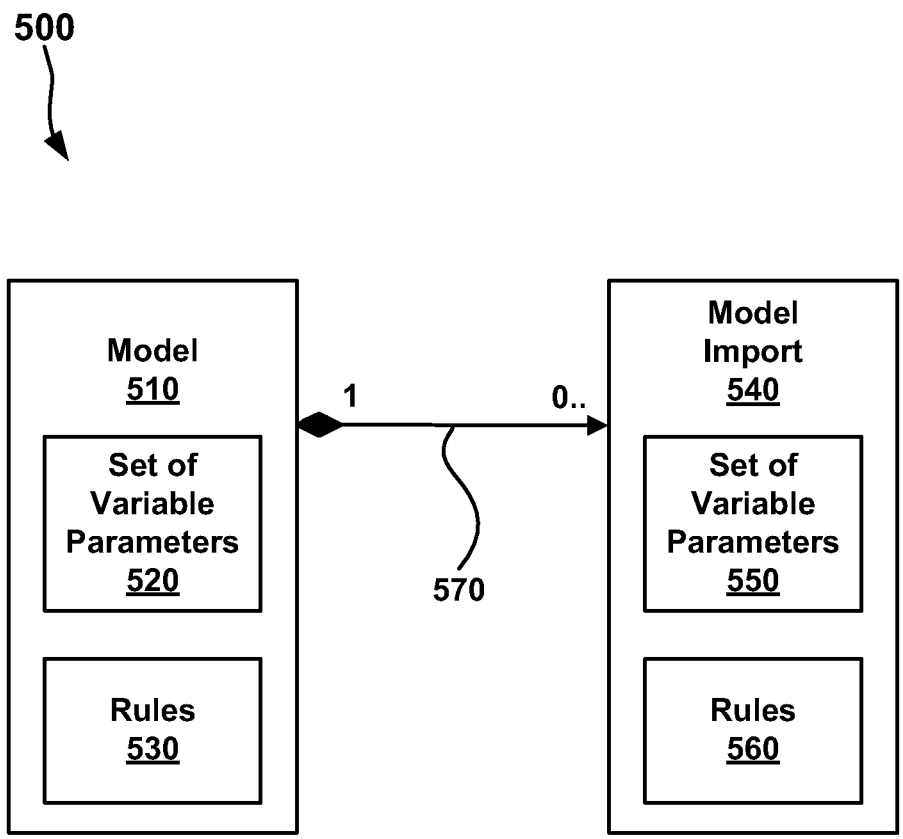
FIG. 5 illustrates a block diagram of a service association, according to an embodiment.

FIG. 5 illustrates a block diagram 500 of a service association, according to an embodiment. The block diagram 500 includes a model 510 and a model import 540. The model 510 and model import 540 are similar to models 110, 112, and 114, as discussed herein. In one embodiment, the model 510 is self sufficient, that is, the model 510 does not use other models, such as the model import 540, to implement a service package. The service package is discussed with regard to FIG. 6 and further herein. In another embodiment, the model 510 imports one or more model imports, such as the model import 540, to implement the service package.

The model 510 imports model imports depending on the selected service offerings, a set of variable parameters 520, and rules 530. For example, if a user selects a web server service, the model 510 may import a model import with a web server service. In various embodiments, the model 510 imports model imports depending on a set of variable parameters and rules of a model import, such as, a set of variable parameters 550 and rules 560 of model import 540.

A set of variable parameters is associated with a model. For example, the sets of variable parameters 520 and 550 are associated with the model 510 and model import 540, respectively. Each variable parameter in the set of variable parameters is identifiable and is associated with a definition. In one embodiment, the variable parameter is identifiable by a name, for example "ServiceLevel." In another embodiment, the variable parameter is identifiable by a reference. The definition is an abstract class which allows for several definition types. Some definition types include a variable, for example "Gold," a range, for example "[2, 6]," a constraint, for example ">10," an enumeration, for example "{"Gold," "Silver," "Bronze"}," and the like.

In various embodiments, models include rules, such as rules 530. The rules define valid combinations of services, service characteristics, hardware, and firmware. For example, a valid combination of a high performance web server service is to have at least ten servers and two load balancers.

In one embodiment, a variable parameter is used to characterize a functional and/or non-functional attribute of a model. A functional attribute is an optional, orderable feature of a service. For example, a service offering for instant messaging has the feature of storing messages in a server for later recall. A non-functional attribute addresses a performance, a service levels, and the like, which is not directly orderable, such as a response time for Instant Messages (e.g. guaranteed message delivery within 800 ms). Functions of variable parameters may be used to characterize attributes. For example, attribute ResponseTime is resolved from the variable parameter ServiceLevel using the following conditional switch definition:

case Gold: <10 ms (milliseconds)
case Silver: <50 ms
case Bronze: <100 ms,
where the ServiceLevel is "Gold," "Silver," or "Bronze."

In various embodiments, an attribute is a function of a variable parameter, that is, the attribute is not user defined. Attributes may be resolved from combinations of conditional switches, conditional ifs, and variable parameters. For example, an attribute is resolved from a function using one variable parameter if security is "low," two variable parameters if security is "medium," and five variable parameters if security is "high." In various embodiments, a variable parameter is a constructional variable parameter. A variable parameter affects the construction of the model object at instantiation time. In some embodiments, models have at least one variable parameter that defines a functional or non-functional attribute of the model.

In another embodiment, a variable parameter is used for model importation. In various embodiments, variable parameters are passed to imported models and used within the imported model to resolve attributes and intra-model dependencies. In one embodiment, if a constructional variable parameter is not passed to the imported model, a default value is used. In another embodiment, if a constructional variable parameter is not passed to the imported model, a user is prompted to supply one or more additional variable parameters.

A model may import model imports, as indicated by path 570. In one embodiment, model importation is performed by referencing from model from another model. In another embodiment, model importation is performed by searching for available models that meet desired criteria. For example, a model searches for a service that permits desired functionality. Model importation may be direct, that is non-conditional, conditional, or indirect. Conditional importation allows models to import different models based on the variable parameters and/or attributes. Indirect importation allows models to import models from the imported model.

In one embodiment, a model may be imported using a conditional import. For example, app1, a model, has a variable parameter Performance with a domain of {high, low}. If Performance equals high, then database1, another model, is imported. If Performance equals low, then database2, is imported.

In another embodiment, a model may be imported using a non-conditional import and having an imported variable parameter conditional on a passed variable parameter. For example, app1, a model, has a variable parameter Performance with a domain of {high, low}. App1 imports database1, where database1 has a variable parameter ServiceLevel with a domain of {Gold, Silver}. If app1's Performance is set to high, then database1's ServiceLevel will be set to Gold. If Performance is set to low, then ServiceLevel may be set to either Gold or Silver.

It is understood that a model may import other models both non-conditionally and conditionally, and that these imported models may have one or more imported variable parameters conditional on passed variable parameters.

Model importation may increase variation and combinations of service selections, while managing a complexity of model definitions.

Figure 6:
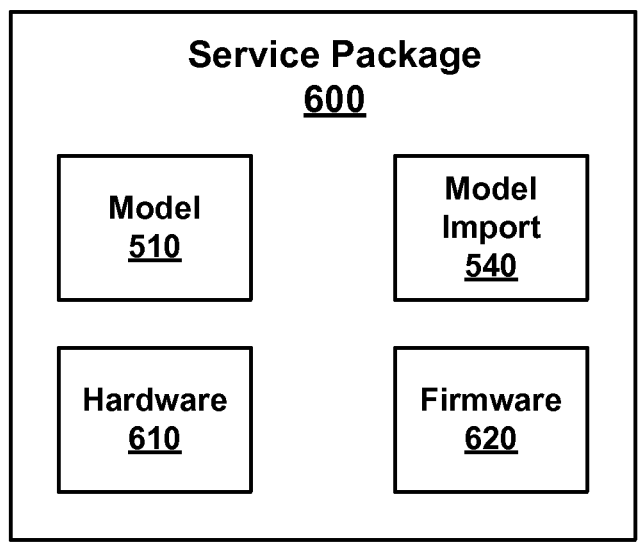
FIG. 6 illustrates a block diagram of a service package, according to an embodiment.

FIG. 6 illustrates a block diagram of a service package 600, according to an embodiment. The service package includes the model 510, the model import 540, hardware 610, and firmware 620. The service package 600 includes a selected service offering that has been grounded, as discussed herein. The hardware 610 and/or firmware 620 may be offered in the service offering or provided by a user. It is understood that the service package may include fewer or more items than depicted in service package 600. For example, the service package may include a single model, no hardware and no firmware. In another example, the service package may include several models (including model imports) and several hardware and/or firmware components.

Figure 7A:
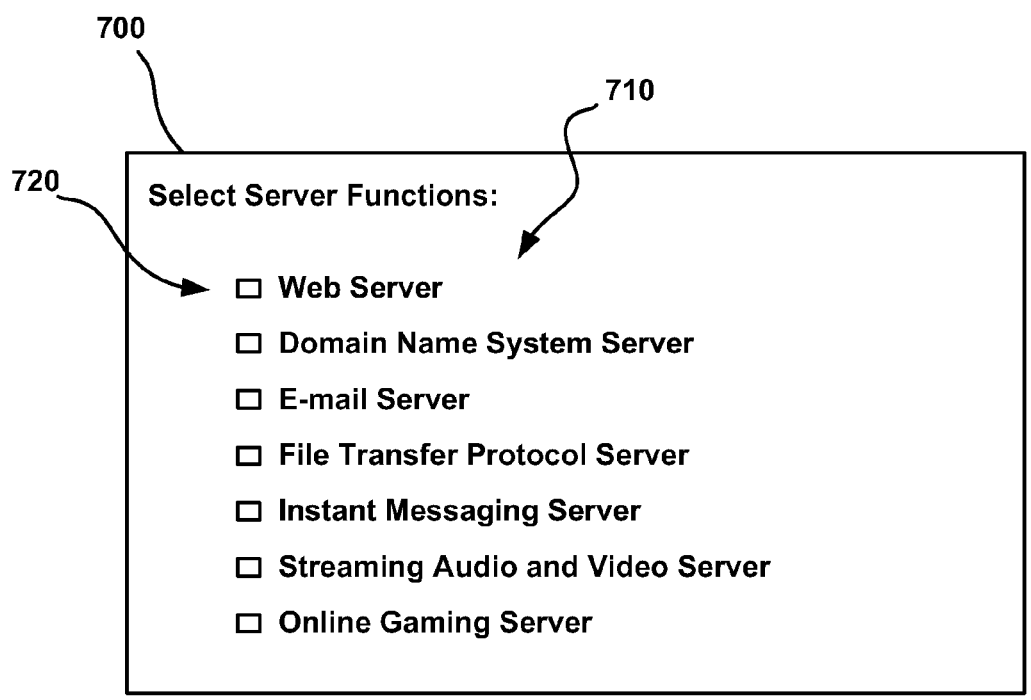
FIGS. 7A and 7B illustrate characteristic selection interfaces, according to an embodiment.
Figure 7B:
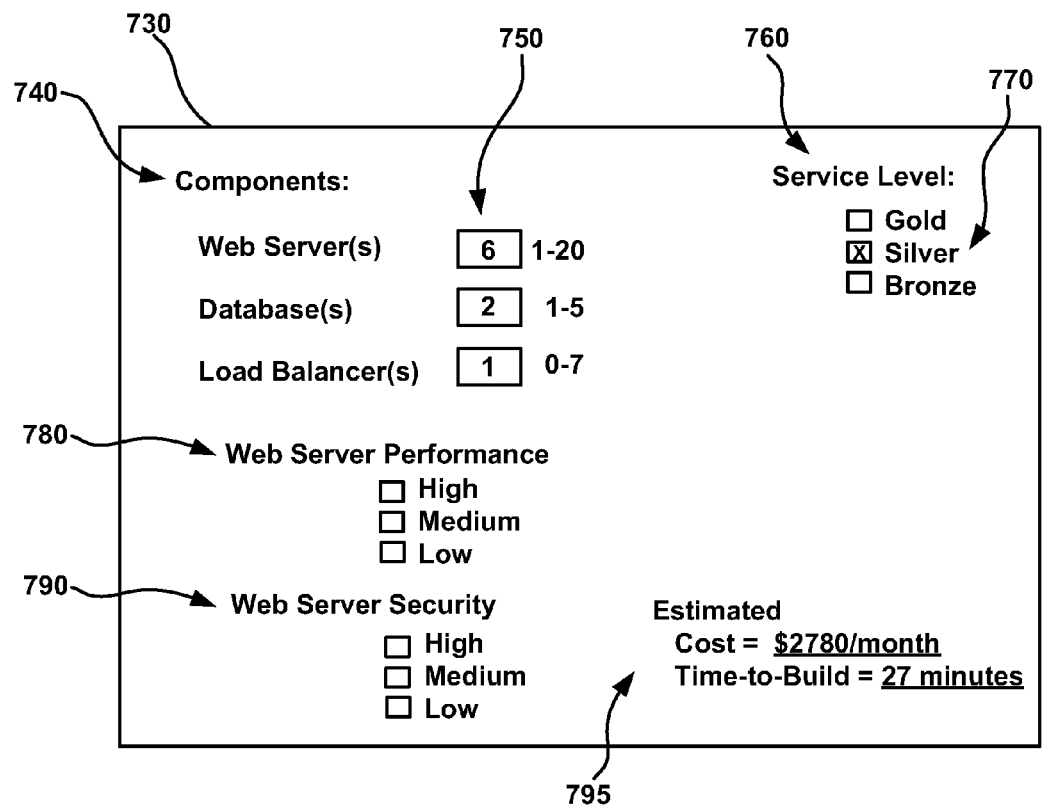

FIGS. 7A and 7B illustrate characteristic selection interfaces 700 and 730, according to an embodiment. Interface 700 includes a listing of service offerings 710 and check boxes, such as check box 720. In this interface depiction, a user selects one or services to include in a service package. The one or more services are captured by variable parameters. In various embodiments, after a user selects the one or more services, another display is presented. For example, after a user selects a web server service, a display with web server options, such as interface 730, is presented to allow the user to select additional detailed variable parameters regarding the web server service.

The interface 730 includes a component listing 740, a component quantity selection 750, a service level listing 760, a service level selection 770, a web server performance listing 780, a web server security listing 790, and an estimated cost and time-to-build 795. The interface 730 provides a means to capture desired options and quantities. It should be understood that if different services are selected, then options may be tailored to the different services and displayed accordingly. The estimated cost and time-to-build 795 represent characteristics of the service model. In some embodiments, the estimated cost and time-to-build 795 dynamically change after variable parameters are received.

In various embodiments, a series of dynamic displays are presented to the use to capture different desired characteristics of each service. The dynamic display changes as variable parameters are entered reflecting changes of options. For example, if a user selects a Bronze service level, the option for a load balancer may grey out or disappear to indicate that the bronze service level does not have a load balancer. It is understood that displays and interfaces are shown for example and may have many different presentations, as well as different ways to select service offerings, such as text inputs.

It should be understood that a series of interdependent services and options may be offered and displayed. For example, if a user requests a web server service, options for components for the web server service may be presented, such as in display 730. The user may submit variable parameters for options for each of the components for the number of servers, the number of databases, the number of balancers, service level, performance level, and security levels. In various embodiments, the user may submit variable parameters for different performance and security levels for each component. In one embodiment, service model for each of web server, database, and load balancing services may be imported, passing variable parameters and resolving any conditional attributes, and intra-model dependencies. It should be understood that these services may import more service models and further resolve any other dependencies.

In various embodiments, a model determines a difference of components between a selected service level and a different service level. For example, a user selects a service level of Silver, the model determines that with three more servers and one more database, the user may order a Gold service level, and with one fewer server and one fewer load balancer, the user may order a Bronze service level.

Figure 8:
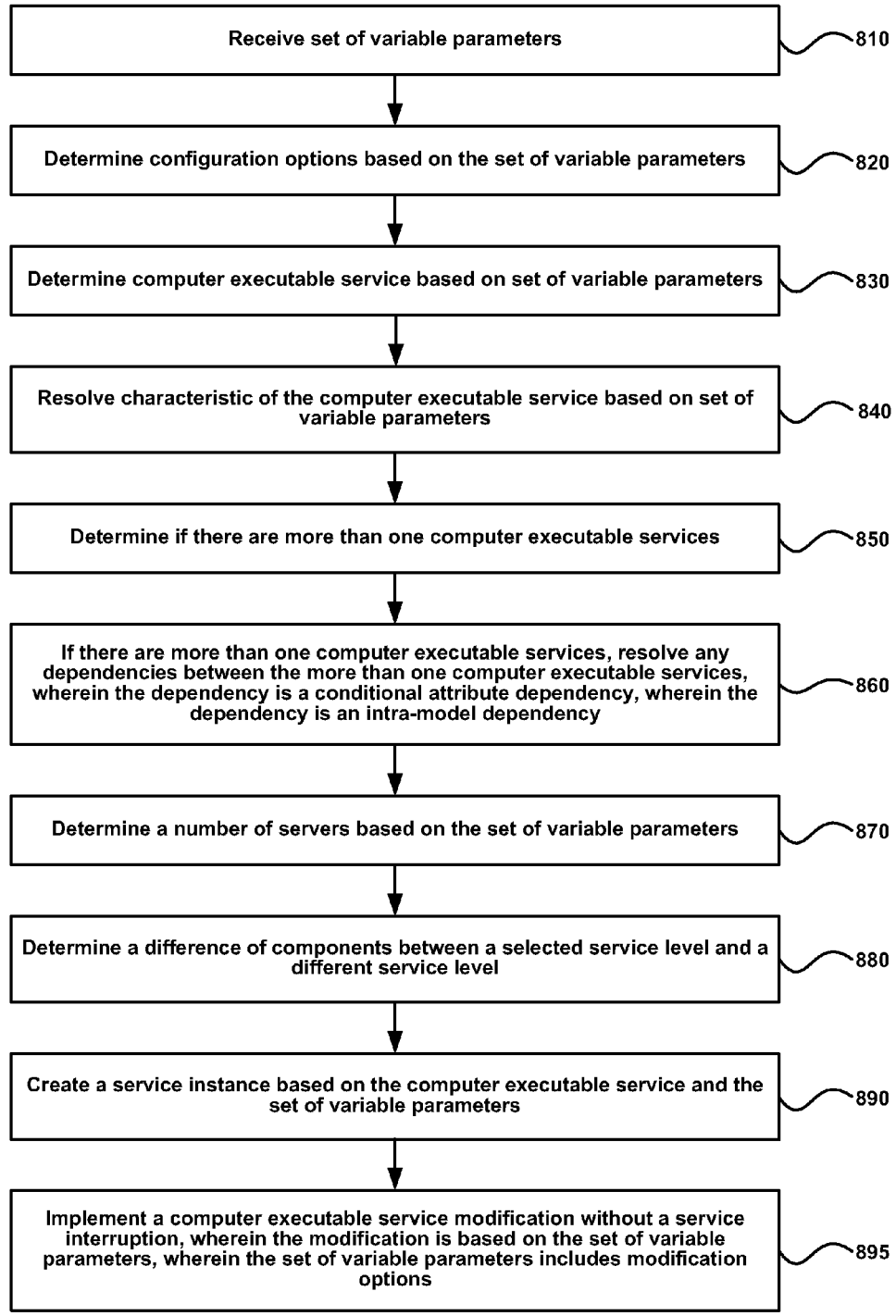
FIG. 8 is a flow chart of a method for determining services, according to an embodiment.

FIG. 8 is a flow chart of a method for determining services, according to an embodiment. In a particular embodiment, the method may be used to determine computer executable services offered by the model 510 of FIG. 5. In an embodiment, the method may be used to instantiate services provided by the architecture 200 deployable in an e-commerce environment. At step 810, the model 510 receives a set of variable parameters 520. In one embodiment, the set of variable parameters includes at least two configuration options. The configuration options may be conditional on a quantity of server, comprise different security level options, comprise performance levels, and/or the like. Configuration options are further discussed herein. In another embodiment, the set of variable parameters includes a server quantity parameter variable, a database quantity parameter variable, and a load balancer quantity parameter variable. In various embodiments, the server quantity parameter variable is conditionally based on a service level. In various embodiments, a service level is conditionally based on the server quantity parameter variable.

In various embodiments, as shown in step 820, the model 510 determines configuration options based on the set of variable parameters. For example, after a user requests a medium performance database service and a secure e-mail service, the model 510 determines different configuration options, such as a) four servers and two load balances running Linux, and b) five servers running Unix. In one embodiment, the determination is dynamic and a different display is presented to the user.

In step 830, the model 510 determines at least one computer executable service based on the set of variable parameters. In one embodiment, the model 510 determines computer executable services based on at least one variable parameter. In another embodiment, each computer executable service is characteristically dependent on at least one variable parameter. In various embodiments, the computer executable service is an all-inclusive service package.

In various embodiments, as shown in step 840, the model 510 resolves a characteristic of the computer executable service based on the set of variable parameters. For example, based on the selected options of the variable parameters, the model determines the build time to take twenty minutes.

In step 850, the model 510 determines if there are more than one computer executable services. In one embodiment, the model 510 may import several models to build upon one computer executable service. In another embodiment, the model may include several services. In yet another embodiment, the model 510 may import several models to build several computer executable services.

In step 860, if there are more than one computer executable services, resolving any dependencies between the more than one computer executable services. In one embodiment, the dependency is a conditional attribute. For example, an attribute of a first computer executable service is dependent on a variable parameter associated with a second computer executable service. In another embodiment, the dependency is an intra-model dependency. For example, a computer executable service is dependent on a variable parameter associated with another computer executable service. In various embodiments, the intra-model dependency may be associated with several variable parameters and/or services.

In various embodiments, as shown in step 870, the model 510 determines a number of servers based on the set of variable parameters. In one embodiment, the model 510 determines a number of processors based on the set of variable parameters.

In various embodiments, as shown in step 880, the model 510 determines a difference of components between a selected service level and a different service level. In one embodiment, three different service levels (Gold, Silver, and Bronze) are used to distinguish different levels of service. It is understood that differences of service levels may be arbitrary and may be defined differently by different entities.

In various embodiments, as shown in step 890, the model 510 creates a service instance based on the computer executable service and the set of variable parameters. Service creation and instantiation is discussed further herein.

In various embodiments, as shown in step 895, the model 510 implements a computer executable service modification. In one embodiment, the modification is based on the set of variable parameters including options to modify a previously instantiated computer executable service. For example, a user, desiring to change a service level from Silver to Gold, executes the model 510, and selects a Gold service level option. In various embodiments, the modification is implemented without a service interruption. This allows users to seamlessly change services.

It is understood, that various steps described above may be added, omitted, combined, altered, or performed in different orders. For example, a number of processors may be determined in addition to a number of servers based on a set of variable parameters. In another example, a step may be added to refine the service model, and then instantiate the service model. In another example, multiple services may be imported calling on multiple service models.

Figure 9:
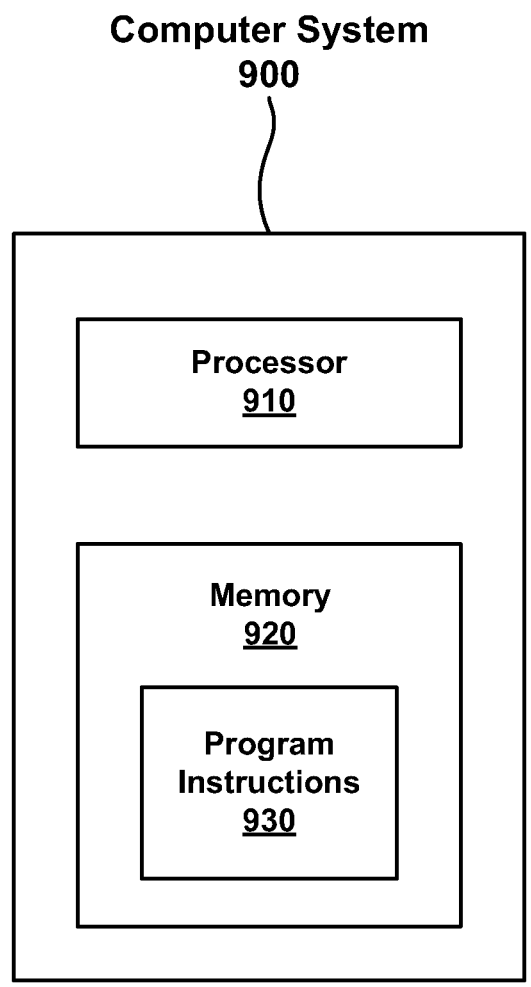
FIG. 9 illustrates a block diagram of a computer system, according to an embodiment.

FIG. 9 illustrates a block diagram of a computer system 900, according to an embodiment. The computer system 900 includes a processor 910 coupled to a memory 920. The memory 920, computer executable medium, is operable to store program instructions 930 that are executable by the processor 910 to perform one or more functions. It should be understood that the term "computer system" is intended to encompass any device having a processor that is capable of executing program instructions from a memory medium. In a particular embodiment, the various functions, processes, methods, and operations described herein may be implemented using the computer system 900. For example, the model 100, the architecture 200, the configure-to-order system 202 and similar others may be implemented using the computer system 900.

The various functions, processes, methods, and operations performed or executed by the computer system 900 can be implemented as the program instructions 930 (also referred to as software or simply programs) that are executable by the processor 910 and various types of computer processors, controllers, central processing units, microprocessors, digital signal processors, state machines, programmable logic arrays, and the like. In an example, non-depicted embodiment, the computer system 900 may be networked (using wired or wireless networks) with other computer systems.

In various embodiments the program instructions 930 may be implemented in various ways, including procedure-based techniques, component-based techniques, object-oriented techniques, rule-based techniques, among others. The program instructions 930 can be stored on the memory 920 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a processor, a set of variable parameters, wherein the set of variable parameters includes selectable service levels;
determining, by the processor, a plurality of computer executable services based on the set of variable parameters, wherein each of the plurality of computer executable services is characteristically dependent on at least one variable parameter of the set of variable parameters;
resolving, by the processor, any dependencies between the plurality of computer executable services;
determining, by the processor, a difference of components between a service level selected by a user and a different service level available to the user;
receiving, by the processor, a selection of the different service level from the user; and
modifying, by the processor, the computer executable services to the different service level without a service interruption.

2. The method of claim 1, further comprising resolving, by the processor, a characteristic of at least one of the plurality of computer executable services based on the set of variable parameters.

3. The method of claim 1, wherein resolving, by the processor, any dependencies comprises resolving an attribute of a first computer executable service of the plurality of computer executable services dependent on a variable parameter associated with a second computer executable service of the plurality of computer executable services.

4. The method of claim 1, wherein resolving, by the processor, any dependencies comprises determining that a first computer executable service of the plurality of computer executable services is conditionally based on one variable parameter of the set of variable parameters, wherein the one variable parameter is associated with a second computer executable service of the plurality of computer executable services.

5. The method of claim 1, wherein resolving, by the processor, any dependencies comprises determining, by the processor, that a first computer executable service of the plurality of computer executable services is conditionally based on two variable parameters of the set of variable parameters, wherein the two variable parameters are associated with a second computer executable service of the plurality of computer executable services.

6. The method of claim 1, wherein the set of variable parameters comprises at least two configuration options.

7. The method of claim 6, wherein one configuration option of the at least two configuration options is conditional on a quantity of servers.

8. The method of claim 6, wherein the at least two configuration options comprise different performance levels options.

9. The method of claim 1, further comprising determining, by the processor, a configuration option based on the set of variable parameters.

10. The method of claim 1, wherein the set of variable parameters comprises a server quantity parameter variable, a database quantity parameter variable, and a load balancer quantity parameter variable.

11. The method of claim 10, wherein the server quantity parameter variable is conditionally based on a service level.

12. The method of claim 10, wherein a service level is conditionally based on the server quantity parameter variable.

13. The method of claim 1, wherein at least one of the plurality of computer executable services comprises a service package.

14. The method of claim 1, wherein the set of variable parameters comprises options to modify a previously instantiated computer executable service.

15. The method of claim 1, further comprising determining, by the processor, a number of servers based on the set of variable parameters.

16. The method of claim 1, further comprising creating, by the processor, a service instance based on at least one of the plurality of computer executable services and based on the set of variable parameters.

17. A method comprising:
receiving, by a processor, a set of variable parameters, wherein the set of variable parameters includes selectable service levels;
determining, by the processor, at least two computer executable services based on the set of variable parameters, wherein each of the at least two computer executable services is characteristically dependent on at least one variable parameter of the set of variable parameters;
determining, by the processor, at least one conditional attribute between the at least two computer executable services;
resolving, by the processor, the at least one conditional attribute;
determining, by the processor, a difference of components between a service level selected by a user and a different service level available to the user;
receiving, by the processor, a selection of the different service level from the user; and
modifying, by the processor, the computer executable services to the different service level without a service interruption.

18. A non-transitory computer readable medium storing instructions that, when executed by a computing device to process concurrent events in a provisional network, cause the computing device to:
receive a set of variable parameters, wherein the set of variable parameters includes selectable service levels;
determine a plurality of computer executable services based on the set of variable parameters, wherein each of the plurality of computer executable services is characteristically dependent on at least one variable parameter of the set of variable parameters;
resolve any conditional attributes between the plurality of computer executable services;
determine a difference of components between a service level selected by a user and a different service level available to the user;
receive a selection of the different service level from the user; and
modify the computer executable services to the different service level without a service interruption.

* * * * *